(12) United States Patent
Yasue

(10) Patent No.: US 9,279,744 B2
(45) Date of Patent: Mar. 8, 2016

(54) ANOMALY DIAGNOSIS SYSTEM

(71) Applicant: DENSO CORPORATION, Kariya, Aichi-pref. (JP)

(72) Inventor: Motohiro Yasue, Tokai (JP)

(73) Assignee: DENSO CORPORATION, Kariya (JP)

( * ) Notice: Subject to any disclaimer, the term of this patent is extended or adjusted under 35 U.S.C. 154(b) by 71 days.

(21) Appl. No.: 14/246,196

(22) Filed: Apr. 7, 2014

(65) Prior Publication Data

US 2014/0350779 A1 Nov. 27, 2014

(30) Foreign Application Priority Data

May 24, 2013 (JP) ................................. 2013-110163

(51) Int. Cl.
*G01M 17/00* (2006.01)
*F02F 3/00* (2006.01)

(52) U.S. Cl.
CPC ........ *G01M 17/00* (2013.01); *F02F 3/00* (2013.01); *F02F 2200/04* (2013.01); *F05C 2201/021* (2013.01)

(58) Field of Classification Search
CPC ... F02F 2200/04; F02F 3/00; F05C 2201/021; G01M 17/00
USPC .......... 701/29.1–31.3, 31.7, 31.9, 32.7–32.9; 702/182–185; 340/636.12, 636.15; 307/9.1, 10.1
See application file for complete search history.

(56) References Cited

U.S. PATENT DOCUMENTS

| | | | |
|---|---|---|---|
| 5,897,596 A * | 4/1999 | Kabune et al. ............... | 701/29.2 |
| 6,601,002 B1 * | 7/2003 | Ennis et al. ................. | 702/60 |
| 6,678,851 B1 * | 1/2004 | Ootani ......................... | 714/733 |
| 6,795,268 B1 * | 9/2004 | Ryan ........................ | 360/78.04 |
| 6,828,914 B2 * | 12/2004 | Zur et al. ................... | 340/636.1 |
| 7,061,247 B2 * | 6/2006 | Inokuchi et al. .............. | 324/430 |
| 7,557,459 B2 * | 7/2009 | Yamashita et al. ............. | 307/9.1 |
| 7,719,134 B2 * | 5/2010 | Hashimoto et al. .......... | 307/10.1 |
| 7,923,866 B2 * | 4/2011 | Ichikawa et al. ............... | 307/82 |
| 8,159,184 B2 * | 4/2012 | Emori et al. ................. | 320/116 |
| 8,401,728 B2 * | 3/2013 | Kubo et al. .................. | 701/29.1 |
| 2005/0253458 A1 * | 11/2005 | Omae et al. ................. | 307/10.1 |
| 2009/0252045 A1 | 10/2009 | Noguchi | |
| 2010/0148577 A1 * | 6/2010 | Cheng ........................... | 307/9.1 |
| 2011/0264323 A1 | 10/2011 | Sakakibara et al. | |
| 2014/0148981 A1 * | 5/2014 | Jang et al. ....................... | 701/22 |
| 2014/0358360 A1 * | 12/2014 | Yasue .......................... | 701/31.7 |
| 2014/0379200 A1 * | 12/2014 | Yagi et al. .................... | 701/29.4 |

FOREIGN PATENT DOCUMENTS

| | | |
|---|---|---|
| JP | 1999-055848 A | 2/1999 |
| JP | 2007-112303 A | 5/2007 |
| JP | 2011-091878 A | 5/2011 |

* cited by examiner

*Primary Examiner* — Fadey Jabr
*Assistant Examiner* — Angelina Shudy
(74) *Attorney, Agent, or Firm* — Posz Law Group, PLC

(57) ABSTRACT

Any one of ECUs that are operating detects a present power supply voltage repeatedly. When the voltage detected at the present time is changed from the voltage detected at the previous time, a difference is calculated as a variation value and the repeatedly calculated variation values are integrated to provide a voltage variation integrated value. When the variation of the power supply voltage of an ECU becomes great relatively due to a loose connection in a power supply line, the calculated voltage variation integrated value becomes greater than those of the other ECUs. In addition, when a defect arises in a common power supply source, the voltage variation integrated value increases in all the ECUs. Therefore, each integrated value of the variation values of the power supply voltage in each of the ECUs enables an anomaly diagnosis of an occurrence point of the defect.

14 Claims, 4 Drawing Sheets

ANOMALY DIAGNOSIS SYSTEM

CROSS REFERENCE TO RELATED APPLICATION

The present application is based on Japanese Patent Application No. 2013-110163 filed on May 24, 2013, the disclosure of which is incorporated herein by reference.

TECHNICAL FIELD

The present disclosure relates to an anomaly diagnosis system to perform an anomaly diagnosis in an in-vehicle network that connects a plurality of electronic control units (ECUs) that are permitted to communicate with each other.

BACKGROUND ART

Patent Literature 1: JP 2007-112303 A

For instance, Patent Literature 1 discloses an anomaly diagnosis system connecting a plurality of apparatus ECUs and a power ECU via a network. The plurality of apparatus ECUs are to perform controls of respective apparatuses by receiving electric power from an in-vehicle power source; the power ECU is to detect a state of the in-vehicle power source or a power source switching relay. Such a system can specify a reason or occurrence point of a defect, if occurs.

In the anomaly diagnosis system, an apparatus ECU detects a power supply voltage that is provided to the apparatus ECU itself. When detecting a defect such as voltage variation, instantaneous power interruption, or voltage decline, the system stores a diagnostic informational item that indicates the defect. The power ECU collects the diagnostic informational items from the respective apparatus ECUs. If detecting a defect regarding power supply in at least one apparatus ECU, the power ECU tries to detect whether an anomaly occurred at the time of defecting the defect in several check points such as a power supply to each apparatus ECU, a state of the in-vehicle power source, or a state of the power source switching relay. From the comprehensive relation of the detection results of the several points, the power ECU specifies the occurrence point or detailed contents of the defect regarding the power supply and stores the specified informational data in a memory.

Various in-vehicle ECUs have been required recently to execute the various kinds of controls even when the host vehicle is under a stop state. For example, the controls under the vehicle stop state include a "smart key control" to control locking/unlocking of vehicle doors via two-way communications between an in-vehicle apparatus and a portable key, and a "charge control" to control charging in an electric vehicle or a plug-in hybrid vehicle.

The vehicle stop state disables the generation by an alternator or the regeneration brake by an in-vehicle motor. This situation significantly requires the power consumption by each ECU to be decreased to a minimum level. This leads in proposals of technologies that cause each of the various kinds of ECUs mentioned above to enter a sleep mode if unnecessary for controls or cause only some of the ECUs related with a specific control that needs to be activated even under the vehicle stop state.

SUMMARY

Such a situation where only some or part of the ECUs are activated may cause the anomaly diagnosis system described in Patent Literature 1 to fail a suitable anomaly diagnosis. That is, the anomaly diagnosis system in Patent Literature 1 specifies the contents of a defect or the occurrence point of the defect in the power supply from the comprehensive relation of the diagnosis information from all the apparatus ECUs and the anomaly detection results of the state of the in-vehicle power source or power source switching relay in the power ECU. In contrast, in a situation where only part of ECUs are activated whereas the other ECUs are under the sleep mode, the anomaly diagnosis system in Patent Literature 1 cannot obtain necessary information from the ECUs under the sleep mode. This makes it difficult to perform a suitable diagnosis or identification of a defect.

In consideration of the above situation, it is an object of the present disclosure to provide an anomaly diagnosis system which can diagnose an occurrence point of a defect if having occurred even in a situation where only part of ECUs are activated among all the ECUs in a network.

To achieve the above object, according to an example of the present disclosure, an anomaly diagnosis system is provided as follows. The anomaly diagnosis system is to perform an anomaly diagnosis in an in-vehicle network where a plurality of electronic control units are connected to mutually communicate. The anomaly diagnosis system includes a power supply portion, a voltage detection portion, an integration section, and a diagnosis section. The power supply portion is to provide an electric power to each of the plurality of electronic control units. The voltage detection portion is provided in a subject electronic control unit being any one of the plurality of electronic control units; the voltage detection portion is to detect a power supply voltage in the subject electronic control unit repeatedly while the subject electronic control unit perform an operation. The integration section is provided in the subject electronic control unit; the integration section is to (i) calculate a variation value indicating a variation that arises when the power supply voltage detected by the voltage detection portion is changed from the power supply voltage detected at a previous time, and (ii) integrate the variation values calculated repeatedly to calculate an integrated value with respect to the subject electronic control unit. The diagnosis section is to perform an anomaly diagnosis based on the respective integrated values calculated with respect to the plurality of electronic control units. Further, the integration section calculates the integrated value by substituting a corresponding value for the variation value at an activation time when the subject electronic control unit is activated, the corresponding value corresponding to the power supply voltage detected by the voltage detection portion at the activation time when the subject electronic control unit is activated; and the diagnosis section performs the anomaly diagnosis using only the integrated values each being greater than zero.

Under the above configuration, the voltage detection portion repeatedly detects a power supply voltage in any ECU which is operating. When the power supply voltage detected at the present time is changed from the power supply voltage detected at the previous time in each ECU, the integration section in each ECU calculates a variation value representing a magnitude of the variation and integrates the calculated variation values, providing a variation integrated value. For example, when the variation of the power supply voltage of a specific ECU becomes great relatively due to a loose connection in a power supply line, the calculated integrated value becomes greater than those of the other ECUs. In addition, when a defect or failure arises in a power supply source itself, the calculated integrated value increases in each of the ECUs. Therefore, each integrated value of the variation values of the power supply voltage in each of the ECUs enables an anomaly diagnosis of an occurrence point of the defect.

It is noted that the integration section calculates the integrated value by substituting a given value corresponding to the power supply voltage detected by the voltage detection portion at the time of activating an ECU for the variation value. Therefore, when the ECU is activated and starts an operation, the integrated value certainly turns into a value greater than zero. The diagnosis section performs an anomaly diagnosis using only the integrated values each being greater than zero. In other words, an integrated value with respect to an ECU that is not activated or not operating is held at zero; thus, any integrated value with respect to the ECU that is not activated is not used in the anomaly diagnosis. Therefore, even in the case where some ECUs among all the ECUs are not activated, an erroneous determination in the anomaly diagnosis can be prevented.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

Figure 1:
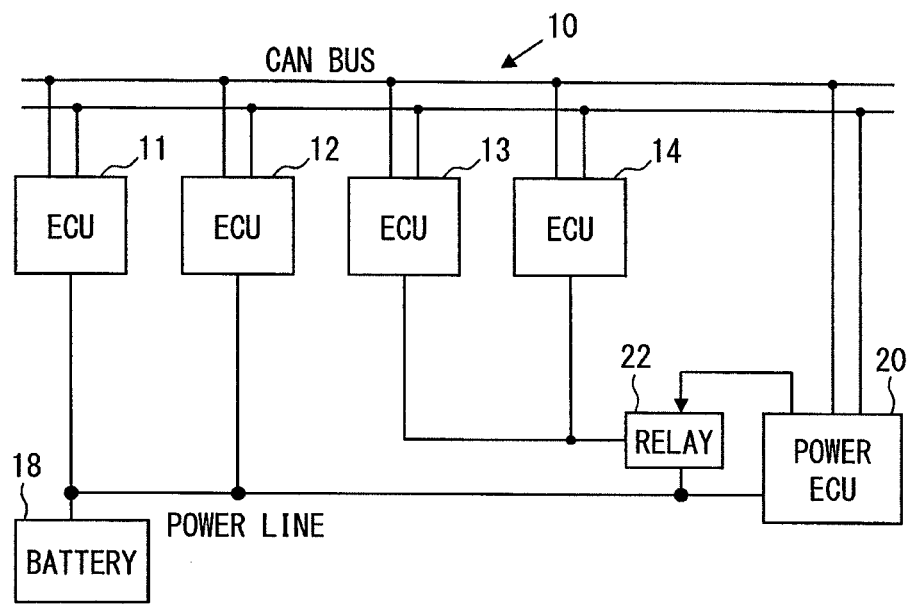
FIG. 1 is a diagram illustrating an example configuration of a network in a vehicle, the network to which an anomaly diagnosis system according to an embodiment of the present disclosure applies.

The following describes an embodiment of the present disclosure with reference to drawings. An anomaly diagnosis system according to an embodiment of the present disclosure applies to a network in a vehicle. FIG. 1 illustrates an example configuration of such a network in the vehicle.

The present embodiment explains a vehicle such as an electric vehicle or a plug-in hybrid vehicle having the network. The vehicle includes a motor as a driving source while driving the motor with a high voltage battery that can receive charge from an external power source. To control the various kinds of in-vehicle apparatuses of the electric vehicle or plug-in hybrid vehicle, a plurality of ECUs (Electronic Control Units) 11 to 14 are provided in the network as shown in FIG. 1. The ECUs 11 to 14 communicate with each other via a communication bus 10 such as a CAN (Controller Area Network) bus. The following explains examples of the ECUs 11 to 14.

For instance, the ECU 11 is a power source verification ECU that performs reciprocal communication with a portable terminal that is held by a user to thereby execute a predetermined process of verification. When the verification is satisfied, the ECU 11 permits the power supply to the various kinds of in-vehicle apparatuses such as a touch sensor provided in a door handle, a door lock motor, an engine starter.

To be specific, when the vehicle is parked under the door locked state, the ECU 11 is provided to undergo a wake-up operation with predetermined time intervals by a timer (unshown) to transmit electric waves to a portable key. Upon finishing the necessary processes such as a transmission/reception of electric waves and the verification process, the ECU 11 enters the sleep state or mode. That is, the ECU 11 is required to be activated when the vehicle is parked or the ignition switch is turned off; thus, the ECU 11 is provided to receive the electric power supply directly from a in-vehicle battery 18 which may be referred to as a power supply portion or source.

For instance, the ECU 12 is a body ECU that performs a door-lock release operation, which is performed when the verification is satisfied in the ECU 11 to apply electric current to a touch sensor in a door handle and then a user manipulation to the touch sensor is detected. To be specific, the ECU 12 performs a door-lock release operation by driving the door lock motor in a predetermined direction to release the door locked state. In addition, the ECU 12 performs a door lock operation by driving the door lock motor in a direction opposite to that in the door-lock release operation when the a door lock switch in a vehicle door is manipulated by a user under the state where the verification is satisfied in the ECU 11.

The ECU 12 is activated based on a wake-up signal from the ECU 11 when the verification is performed or the verification is satisfied in the ECU 11. That is, the ECU 12 also needs to be activated when the ignition switch is turned off; like the ECU 11, the ECU 12 is thereby provided to receive the electric power supply directly from the in-vehicle battery 18.

Thus, the ECU 11 and ECU 12 cooperate to perform a smart key control, which controls the locking/unlocking of vehicle doors through the two-way communications with a portable key held by a user.

For instance, the ECU 13 is a battery ECU which controls a high voltage battery (unshown). The ECU 13 is to calculate a battery residual quantity (SOC: State of Charge) of the high voltage battery based on the charging and discharging currents or battery voltage while performing an equalization process that equalizes the charge states of the respective cells, if included, in the high voltage battery.

For instance, the ECU 14 is a charge/discharge control ECU. The ECU 14 is to control the start and end of a charge/discharge of the high voltage battery when the high voltage battery is charged with an external power source or used as a backup power source or emergency power source to supply electric power to homes. When the charge is performed using an external power source, the ECU 14 confirms the battery residual quantity by communicating with the ECU 13. When the charge is determined to be available, the ECU 14 turns on a relay which connects a charge plug to the high voltage battery. This starts the charge of the high voltage battery. When the ECU 13 detects a full charge state of the high voltage battery after the start of the charge, the ECU 14 turns off the relay and ends the charge. In addition, when the electric discharge plug is connected to the vehicle to supply electric power by causing the high voltage battery to function as a backup power source, the ECU 14 activates an AC inverter (unshown) and thereby converts the direct current voltage of the high voltage battery into the alternating voltage for home uses to output.

The ECU 13 and ECU 14 are connected to the in-vehicle battery 18 via a relay 22. The relay 22 is controlled by a power control ECU 20. The power control ECU 20 turns on the relay 22 to start the power supply to the ECU 13 and ECU 14 when detecting that a charge plug or a discharge plug is connected to the vehicle. Further, the power control ECU 20 notifies the ECU 14 that the charge plug or discharge plug is connected, thereby causing the ECU 14 to start the charge control or discharge control.

The above explains the case where the ECU 13 and ECU 14 receive the power supply from the in-vehicle battery 18 via the relay 22. There is no need to be limited thereto. The ECU 13 and ECU 14 may be provided to receive the electric power supply directly from the in-vehicle battery 18. Furthermore, the ECU 13 and/or ECU 14 may be provided to be activated based on a trigger event that is connection of the charge plug or discharge plug, for example.

As explained above, under the vehicle according to the present embodiment, even when the vehicle is under the stop state, various controls are performed by the respective ECUs 11 to 14, and 20. That is, the ECUs 11 to 14, and 20 perform a smart key control, a charge with an external power source, or a home-use emergency power supply.

Some kind of control leads to the activation of necessary ECUs, which communicate necessary data with each other to thereby perform a desired control. For example, the charge with an external power source is performed by the ECU 13 and ECU 14 collaborating with each other; the smart key control is performed by the ECU 11 and ECU 12 collaborating with each other.

Thus, even under the stop state of the vehicle, a subject ECU needs to operate when the need of the control as explained above occurs or when the need of the control is determined. This prohibits the electric power supply to all the ECUs 11 to 14, and 20 from being simultaneously turned off to move the ECUs 11 to 14, and 20 into the stop state. For instance, the CAN (Controller Area Network) protocol enables the respective ECUs 11 to 14, and 20 to move to the sleep mode to stop a communication function and arithmetic function for power saving under the condition where the communication bus 10 moves to the recessive state and then remains in an idle state (i.e., not crowded state) for a predetermined period of time.

It is noted that the CAN protocol is adopted with a 2-wire communication line serving as the communication bus 10, in which the two wires are connected with the termination resistors at both ends. A subject ECU, which transmits data, controls a transceiver to generate two kinds of high and low potential differences (voltage differences) between the 2-wire communication line to thereby communicate "1" and "0" over the communication bus 10. In this case, the CAN protocol defines the logic "0" as a dominant level generating the high voltage difference in the 2-wire communication line.

It is noted that under a usual CAN protocol, when detecting that the level in the communication bus becomes in the dominant level, any ECU, which has been under the sleep mode, inevitably returns (i.e., transitions) from the sleep mode to the usual mode being an operating mode permitting the communication function and arithmetic function. However, as mentioned above, a specific control often requires only a limited ECU(s) or part of the ECUs to perform the control. The activation of all the ECUs results in useless power consumption.

Figure 2:
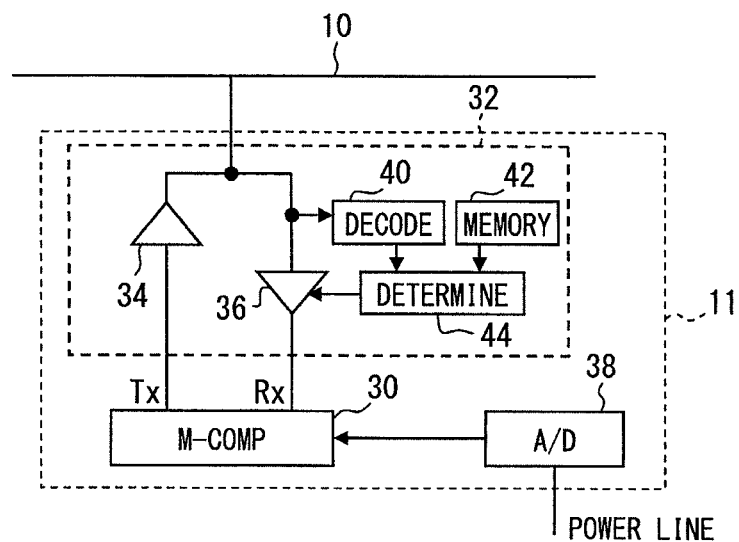
FIG. 2 is a diagram illustrating a schematic internal configuration of an ECU.

To that end, the present embodiment provides a CAN transceiver 32 to activate each of the ECUs 11 to 14, and 20 individually or independently, as shown in FIG. 2. The CAN transceiver 32 is provided in each of the ECUs 11 to 14, and 20. Now, the ECU 11 is used as a representative example ECU to explain an internal ECU configuration containing the CAN transceiver 32.

The ECU 11 includes a microcomputer 30 to execute various kinds of arithmetic processes, and a transceiver 32 to communicate with another ECU via the communication bus 10. The microcomputer 30 has a transmit port Tx connected with a transmitter 34 of the transceiver 32. According to the logical level outputted from the microcomputer 30, the transmitter 34 generates two kinds of high and low voltage differences between the 2-wire communication line of the communication line 10 to thereby communicate "1" and "0" in the communication bus 10. The microcomputer 30 has a receive port Rx connected with a receiver 36 of the transceiver 32. The receiver 36 converts the potential difference in the communication bus 10 into the logical level in the microcomputer 30, and outputs it to the receive port Rx of the microcomputer 30.

Furthermore, the transceiver 32 is equipped with an individual activation signal detection portion which identifies an individual activation signal directed to the ECU 11 (i.e., host ECU) containing the transceiver 32 itself. The individual activation signal is transmitted in the head part of a communication frame. When identifying that the individual activation signal is directed to the ECU 11 or host ECU, the individual activation signal detection portion operates to permit an output of the receiver 36 of the transceiver 32 so as to receive the communication data following the individual activation signal.

The individual activation signal detection portion is provided to include a decoder 40, a memory 42, and a determination portion 44, as indicated in FIG. 2. The decoder 40 decodes a potential difference on the communication bus 10 into a decoded signal, and outputs the decoded signal to the determination portion 44. The memory 42 stores previously an identification code for identifying the host ECU 11 itself. The determination portion 44 permits the output by the receiver 36 when the decoded signal matches the stored identification code.

The above configuration according to the present embodiment enables only part of the ECUs 11 to 14, and 20 to be activated under the vehicle stop state instead of all the ECUs 11 to 14, and 20 being activated simultaneously. Further, the anomaly diagnosis system according to the present embodiment enables a diagnosis of a defected point or occurrence point of a defect that occurs in the power supply to each ECU or the power source itself even when only part of the ECUs 11 to 14, and 20 are activated. The following explains a technique of an anomaly diagnosis in the anomaly diagnosis system according to the present embodiment with reference to FIG. 3 and FIG. 5.

It is further noted that a flowchart in the present application includes sections (also referred to as steps), which are represented, for instance, as S100. Further, each section can be divided into several sections while several sections can be combined into a single section. Furthermore, each of thus configured sections can be referred to as a module, device, or means and achieved not only (i) as a software section in combination with a hardware unit (e.g., computer), but also (ii) as a hardware section (e.g., integrated circuit, hard-wired logic circuit), including or not including a function of a related apparatus. Further, the hardware section may be inside of a microcomputer.

Figure 3:
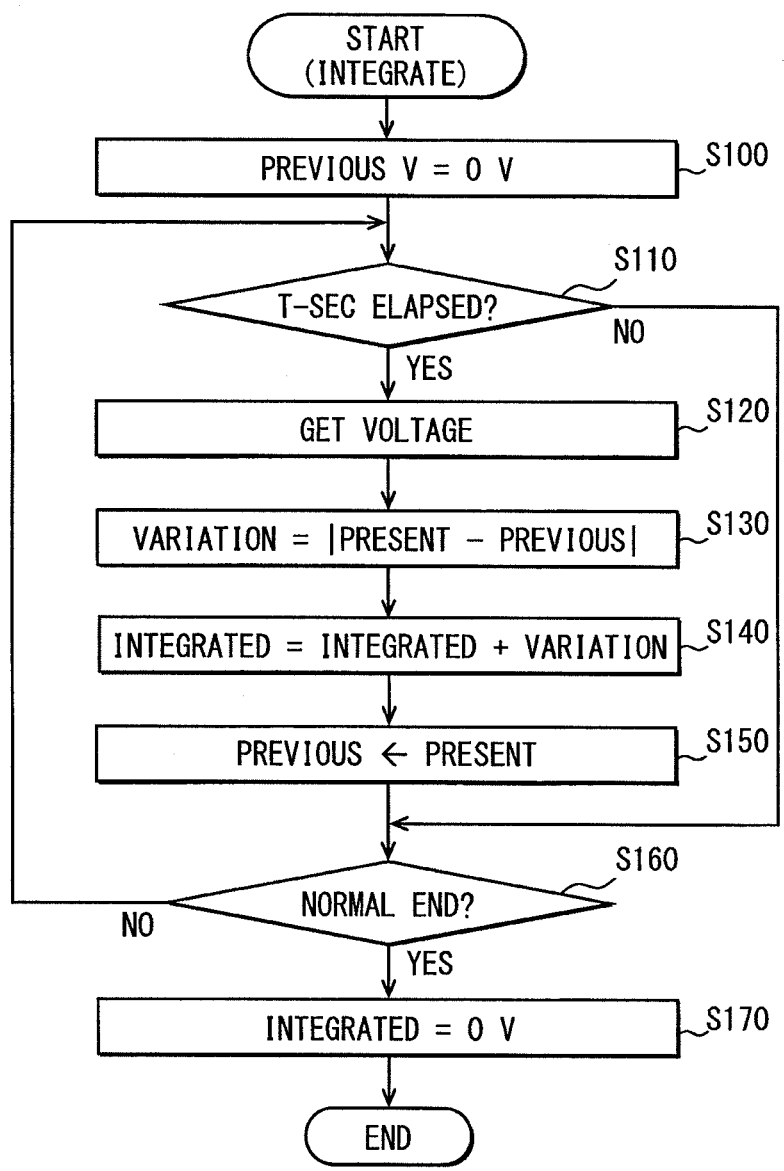
FIG. 3 is a flowchart diagram illustrating a voltage variation integrating process.

The flowchart in FIG. 3 indicates a process continuously executed in each of ECUs 11 to 14, and 20 in a time range from the activation (start) to the normal end of an operation. The normal end of an operation (i.e., a normal end case) includes the case where an ECU finishes a necessary control process and then enters a sleep mode; the case where the power supply is turned off; or the case where an operation is finished due to the ignition switch being turned off. In contrast, there may be a case where the operation of an ECU is reset (i.e., a reset function is applied to the operation) due to (i) an anomaly having occurred in an internal arithmetic process of the ECUs 11 to 14, and 20, or (ii) a decline in the voltage of the power supply. Such a case is regarded as an anomalous end case, where an integrated value which will be explained later is maintained or held unchanged. That is, when a reset function occurs, the processing exits the flowchart, thereby stops once. The processing or operation starts the flowchart again to execute S100 and onward.

It is noted that each ECU is provided with a reset function that resets each ECU itself (i.e., activates each ECU again) when an anomaly occurs in an internal arithmetic process or the voltage of the power supply declines less than a threshold value. Furthermore, each ECU is provided with an internal watch dog circuit that monitors an operation of a microcomputer based on a run pulse outputted from the microcomputer and resets the operation when an anomaly occurs. Although the process in FIG. 3 is performed in each of the ECUs 11 to 14, and 20 in the present embodiment, the explanation below is made, for easy understanding, on the assumption that a subject ECU being any one of the ECUs 11 to 14, and 20 performs the present process in FIG. 3.

At S100, with an activation (including a re-activation due to a reset) of the subject ECU, a previous detection value of a power supply voltage provided to the subject ECU (i.e., a power supply voltage detected at a previous time or last time) is set to zero. It is noted that the previous detection value may be set to any value that is less than a detection value of the power supply voltage.

At S110, it is determined whether a predetermined period of time elapses. The predetermined period of time is, for example, set to one second (1 sec). When it is determined that the predetermined period of time elapses, the processing proceeds to S120. When it is determined that the predetermined period of time does not elapse, the processing proceeds to S160 while skipping S120 to S150. At S120, the power supply voltage provided to the subject ECU is acquired; this will be explained in detail later. The processing at S110 permits such acquisition of power supply voltage at S120 with predetermined time intervals. In addition, the acquisition of power supply voltage is not performed until the predetermined period of time elapses since the subject ECU is activated. This configuration can prevent the detection of unstable power supply voltage that may occur immediately after the activation of the subject ECU. The power supply voltage may be detected for the first time after an initial period of time elapses since the activation of the subject ECU. This initial period of time may be different from the above predetermined period of time as needed.

Again, at S120, the power supply voltage presently provided to the subject ECU is detected. To be specific, as shown in FIG. 2, each ECU contains an A/D converter 38 which converts the power supply voltage presently provided to each ECU into a digital value, which is then inputted into the microcomputer 30 of each ECU. The A/D converter 38 may be referred to as a voltage detection portion. At S130, a voltage variation value is calculated as follows. A present voltage value is defined as a power supply voltage value detected in the process performed at the present time; a previous voltage value is defined as a power supply voltage value detected in the process at the previous time. The present voltage value is subtracted from the previous voltage value that is stored, thereby providing a subtraction result; the absolute value of the subtraction result is defined as a voltage variation value. At S140, a voltage variation integrated value is updated as follows. The voltage variation value obtained at S130 is added onto a previously calculated voltage variation integrated value; this addition updates the voltage variation integrated value from the previously calculated voltage variation integrated value into the presently calculated voltage variation integrated value. At S150, the present voltage value is substituted for the previous voltage value so as to prepare for the next calculation of the voltage variation value.

At S160, it is determined whether the subject ECU ends the operation normally (i.e., the subject ECU reaches a normal end of the operation). When it is determined that the subject ECU does not reach a normal end, or when it is determined that the subject ECU needs to continue the operation, the processing proceeds to S110. In contrast, when it is determined that the subject ECU reaches a normal end of the operation, the processing proceeds to S170, where the voltage variation integrated value calculated at S140 is cleared.

Thus, in the present embodiment, the presently provided power supply voltage is repeatedly detected with predetermined periods of time in each ECU that is operating (under operation). Further, when the detected power supply voltage is changed from the previous detection voltage, a variation value indicating a magnitude of a variation is calculated and the calculated variation value is integrated. For example, a loose connection occurring in a power supply line in a subject ECU may cause the variation in the power supply voltage of the subject ECU to be great relatively as compared with those of other ECUs. In such a case, the calculated voltage variation integrated value becomes greater than those of the other ECUs.

Furthermore, the subject ECU may be reset due to an internal anomaly or decline of the power supply voltage. In such a case, without the processing at S170 is executed, the subject ECU is activated again to re-start the present process from at S100. Since the processing at S170 is not executed, the voltage variation integrated value before the reset is thus maintained or held without being initialized to zero. Further, at S100, the previous detection value of the power supply voltage is set to 0; the voltage variation integrated value calculated at S140 is jumped significantly. As a result, with an occurrence of an anomaly that requires a reset, the resultant voltage variation integrated value in the subject ECU becomes greater significantly than the voltage variation integrated value of another ECU. For example, FIG. 4 illustrates an example case where when the ECU 13 is reset, the voltage variation integrated value of the ECU 13 becomes significantly greater than that of the ECU 14 that is operating concurrently with the ECU 13.

Figure 4:
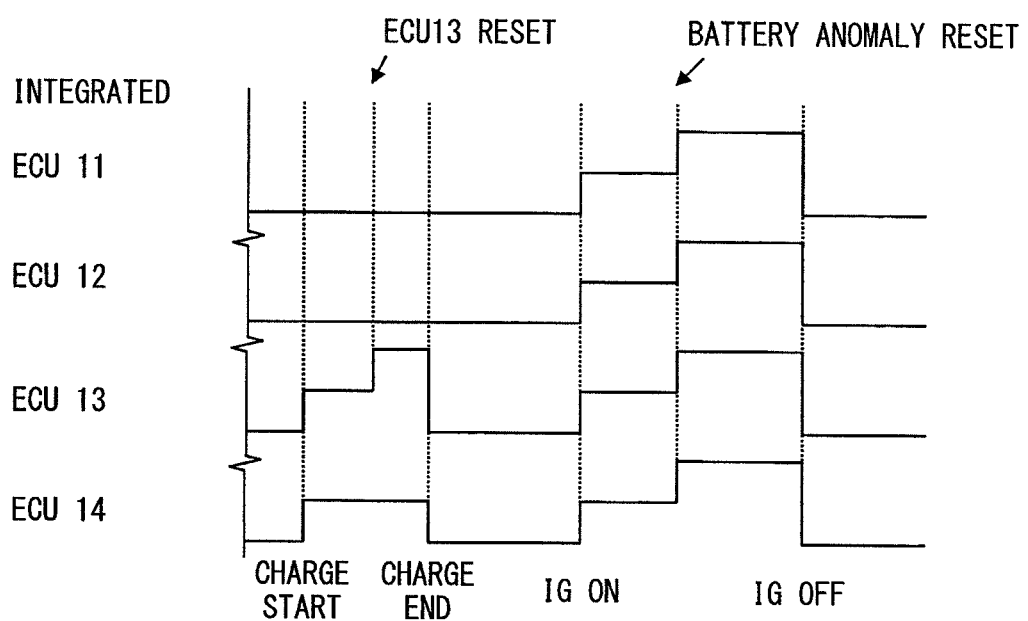
FIG. 4 is a time chart diagram indicating an example of a variation of a voltage variation integrated value.

In addition, for example, FIG. 4 also illustrates another example case where when some defect occurs in the in-vehicle battery 18 itself serving as the power supply source to cause the decline in the power supply voltage to each ECU, all the ECUs are reset to increase all the voltage variation integrated values of the respective ECUs 11 to 14. Further, the processing at S140 or S170 may be referred to as an integration section.

Figure 5:
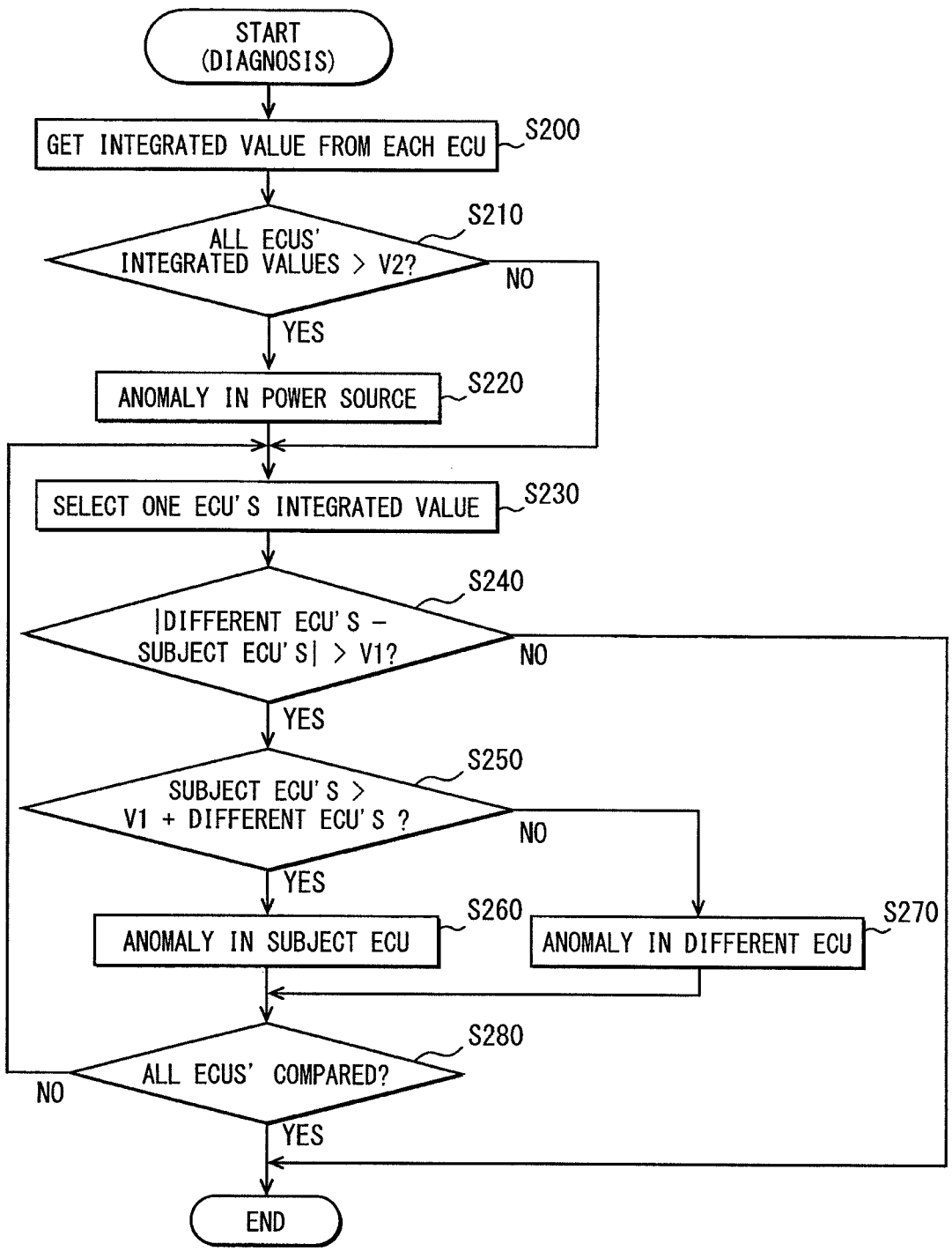
FIG. 5 is a flowchart diagram illustrating an anomaly diagnosis process.

The following explains, with reference to FIG. 5, a process for diagnosing an occurrence of an anomaly or a point at which an anomaly occurs using the voltage variation integrated value calculated in the voltage variation integration process in FIG. 3. Similarly, the process in FIG. 5 is repeated until each ECU ends an operation normally (i.e., each ECU reaches a normal end of an operation). Although the process in FIG. 5 is performed in each of the ECUs 11 to 14, and 20 in the present embodiment, the explanation below is made on the assumption that a subject ECU that is any one of the ECUs 11 to 14, and 20 performs the present process in FIG. 5 for easy understanding. Further, each of all the ECUs excluding the subject ECU is referred to a different ECU in the following explanation.

At S200, the subject ECU acquires the voltage variation integrated values from all different ECUs that are currently operating. The different ECU that is operating may be referred to as an operating different ECU. In the present embodiment, instead of all the ECUs, only part (some) of the ECUs may be activated to perform an intended operation. In such a case, a voltage variation integrated value is acquired by the subject ECU from only each operating different ECU, whereas any voltage variation integrated value is not acquired from each different ECU which is not activated (i.e., is not operating).

Next, at S210, it is determined whether all of (i) the voltage variation integrated value of the subject ECU and (ii) the voltage variation integrated values of operating different ECUs are greater than a second threshold voltage V2 (i.e., a second predetermined value V2). When it is determined that all the voltage variation integrated values each are greater than the second threshold voltage V2, it is regarded or determined that an anomaly occurs in the in-vehicle battery 18 serving as the power supply source. Therefore, the processing proceeds to S220, where the subject ECU stores data to the effect that an anomaly occurs in the power supply source.

At S230, one of the voltage variation integrated values of the operating different ECUs is selected, as a selected voltage variation integrated value of a selected operating different ECU, from all the voltage variation integrated values of the operating different ECUs. At S240, an absolute value of a difference is first calculated in between (i) the above selected voltage variation integrated value and (ii) the voltage variation integrated value of the subject ECU, and it is determined whether the absolute value is greater than a first threshold voltage V1 (i.e., a first predetermined value V1). As explained above, a loose connection in a power supply line in an ECU or an anomaly requiring a reset in the ECU leads to a significant increase of the calculated voltage variation integrated value of the ECU as compared with that of another ECU. Therefore, when the determination at S240 is affirmed, there is a possibility that an anomaly occurs in either the selected operating different ECU or the subject ECU.

At S250, in order to determine in which ECU such an anomaly occurs, a voltage variation integrated value comparison is performed to determine whether the voltage variation integrated value of the subject ECU is greater than the sum of (i) the selected voltage variation integrated value and (ii) the first threshold voltage. The affirmative determination at S250 signifies that the voltage variation integrated value of the subject ECU is greater than the selected voltage variation integrated value of the selected operating different ECU by the first threshold voltage at least. In contrast, the negative determination at S250 signifies that the selected voltage variation integrated value of the selected operating different ECU is greater than the voltage variation integrated value of the subject ECU by the first threshold voltage at least.

Therefore, when the determination at S250 is affirmed, the processing proceeds to S260, where the processing stores data to the effect that an anomaly occurs in the subject ECU itself. In contrast, when the determination at S250 is negated, the processing proceeds to S270, where the processing stores data to the effect that an anomaly occurs in a different ECU other than the subject ECU (i.e., the selected operating different ECU). It is noted that the data to the effect that an anomaly occurs in a different ECU is primarily stored in such a different ECU itself; thus, the processing at S270 may be optional or omitted. In addition, the processing at S260 may store a reason of a reset if the reset arises in the subject ECU itself, in addition to the data to the effect that an anomaly occurs in the subject ECU itself. For example, such a reason of a reset indicates whether a reset is caused by (i) an anomaly in an internal arithmetic process, (ii) an external watch dog timer, or (iii) a low voltage anomaly. This enables easy specification of the reason of an anomaly occurring in the subject ECU.

At S280, it is determined whether all the acquired voltage variation integrated values of all the operating different ECUs are thoroughly subjected to the voltage variation integrated value comparison with that of the subject ECU. When the determination at S280 is affirmed, the present process in FIG. 5 ends. When the determination at S280 is negated, the processing returns to S230, where the voltage variation integrated value to compare is changed to another. The processing repeats S240 and onward. Further, the processing at S210 to S280, S240 to S270, or S210 to S220 may be referred to as a diagnosis section.

Thus, in the present embodiment, when a subject ECU being any one of the ECUs 11 to 14, and 20 is activated, the previous detection value of the power supply voltage provided to the subject ECU is set to zero (0 V) so that the voltage variation value is set to or turns into the power supply voltage presently provided to the subject ECU. Therefore, when the subject ECU is activated and starts an operation, the voltage variation integrated value certainly turns into a value greater than zero. The present anomaly diagnosis process only uses voltage variation integrated values being greater than zero acquired from operating different ECUs that are certainly operating or performing an operation. There may be a case where while only part of the ECUs in a single network are activated and operating, an anomaly occurs in either (i) the in-vehicle battery 18 serving as a power supply source or (ii) any ECU operating. Even in such a case, the present embodiment can detect more accurately an occurrence point of the anomaly or the like.

The embodiment of the present disclosure is thus described; however, without being restricted to the embodiment mentioned above, the present disclosure may be variously modified as long as not deviating from the scope thereof.

For example, the above embodiment provides an example case where each ECU performs an anomaly diagnosis based on the voltage variation integrated values. There is no need to be limited thereto. The anomaly diagnosis may be performed by one or more representative ECUs that are selectively determined from all the ECUs, instead of all the ECUs connected to the network. For instance, one example of such a representative ECU may be the power control ECU 20. In such a case, the representative ECU, which performs an anomaly diagnosis, collects voltage variation integrated values from each ECU, but cannot acquire any voltage variation integrated value from an ECU which is not operating; thus, the voltage variation integrated value of the ECU not operating is set to zero. When the mutual comparison of the voltage variation integrated values is carried out, only the voltage variation integrated values greater than zero are permitted to be used. This enables the mutual comparison of only the voltage variation integrated values of the ECU that are operating.

Further, the above embodiment provides an example case where the comparison is made whether to find a difference between the voltage variation integrated values, the difference being greater than the first threshold voltage V1. The first threshold voltage V1 may be designated as being multiple stepwise threshold values to identify a plurality of anomaly levels or degrees. That is, using the multiple stepwise threshold values enables the distinction of an anomaly degree, for instance, such as a state where a sign of an anomaly arises, or a state where an anomaly is mostly determined to have occurred, and the like. In other words, the first threshold voltage V1 or first predetermined value may be designated as a plurality of different auxiliary levels having one-to-one correspondence with a plurality of different anomalous degrees so that one of different anomalous degrees may be determined depending on the difference being equal to or greater than one of the plurality of different auxiliary levels corresponding to the one of different anomalous degrees.

Further, in the above embodiment, the voltage variation value calculated at S130 may be compared with a third threshold voltage V3 (i.e., a third predetermined value V3). Only when the voltage variation value is determined to be greater than the third threshold voltage V3, it can be a target for calculating a voltage variation integrated value. Such an optional configuration can prevent a value of a slight voltage variation due to noise or the like from being a target for calculating a voltage variation integrated value, thereby providing an advantageous effect of eliminating an influence of the noise or the like. The above advantageous effect can be also achieved, for instance, by applying a filtering process to a calculated voltage variation integrated value for smoothing to obtain a smoothed voltage variation value, which will be used for calculating a voltage variation integrated value.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An anomaly diagnosis system to perform an anomaly diagnosis in an in-vehicle network where a plurality of electronic control units are connected to mutually communicate, the anomaly diagnosis system comprising:
    an in-vehicle battery that provides an electric power to each of the plurality of electronic control units;
    a subject electronic control unit being one of the plurality of electronic control units which are connected to mutually communicate;
    an analog-to-digital (A/D) convertor provided in the subject electronic control unit, the A/D convertor detecting a power supply voltage in the subject electronic control unit repeatedly while the subject electronic control unit performs an operation;
    the subject electronic control unit configured to:
        calculate, by an integration section, a variation value indicating a variation that arises when the power supply voltage detected by the A/D convertor is changed from the power supply voltage detected at a previous time, and
        integrate, by the integration section, the variation values calculated repeatedly to calculate an integrated value with respect to the subject electronic control unit; and
        perform, in a diagnosis section, an anomaly diagnosis that determines where an anomaly occurs based on the respective integrated values calculated with respect to the plurality of electronic control units,
    wherein:
    the subject electronic control unit is further configured to:
        calculate, by the integration section, the integrated value by substituting a corresponding value for the variation value at an activation time when the subject electronic control unit is activated, the corresponding value corresponding to the power supply voltage detected by the A/D convertor at the activation time when the subject electronic control unit is activated; and
        perform, by the diagnosis section, the anomaly diagnosis that determines where the anomaly occurs using only the integrated values each being greater than zero.

2. The anomaly diagnosis system according to claim 1, wherein:
    the diagnosis section compares the integrated value of a first electronic control unit being one of the plurality of electronic control units with the integrated value of a second electronic control unit being another of the plurality of electronic control units excluding the first electronic control unit, calculating a difference between the integrated value of the first electronic control unit and the integrated value of the second electronic control unit; and
    when the difference is equal to or greater than a first predetermined value, the diagnosis section determines that the anomaly occurs in the first electronic control unit or the second electronic control unit, whichever provides the greater integrated value.

3. The anomaly diagnosis system according to claim 2, wherein
    the first predetermined value is designated as a plurality of different auxiliary levels having one-to-one correspondence with a plurality of different anomalous degrees so that the diagnosis section is permitted to determine one of different anomalous degrees depending on the difference being equal to or greater than one of the plurality of different auxiliary levels corresponding to the one of different anomalous degrees.

4. The anomaly diagnosis system according to claim 1, wherein:
    the in-vehicle battery provides, from a single power source, an electric power to each of the plurality of electronic control units; and
    when each of a plurality of the integrated values with respect to the plurality of electronic control units is greater than a second predetermined value, the diagnosis section determines that the anomaly occurs the power source.

5. The anomaly diagnosis system according to claim 1, wherein
    when the subject electronic control unit being any one of the plurality of electronic control units ends an operation normally, the integration section erases the integrated value of the subject electronic control unit which ends the operation normally.

6. The anomaly diagnosis system according to claim 1, wherein:
    when the integrated value calculated is equal to or greater than a third predetermined value, the integration section regards, as a target of integration, the integrated value being equal to or greater than the third predetermined value; and
    when the integrated value calculated is less than the third predetermined value, the integration section precludes, from a target of integration, the integrated value being less than the third predetermined value.

7. The anomaly diagnosis system according to claim 1, wherein
    the integration section smoothes the variation values calculated repeatedly to obtain smoothed variation values, and integrates the obtained smoothed variation values to calculate the integrated value.

8. The anomaly diagnosis system according to claim 1, wherein:

the subject electronic control unit is configured to apply a reset operation to the subject electronic control unit itself when the anomaly occurs in the subject electronic control unit; and the anomaly requiring the reset operation includes a decline in the power supply voltage.

9. The anomaly diagnosis system according to claim 8, wherein when the reset operation is applied to the subject electronic control unit itself, data indicating a reason of the reset operation is stored.

10. The anomaly diagnosis system according to claim 1, wherein the subject electronic control unit is further configured to acquire the respective integrated values, via mutual communication, from the plurality of electronic control units which are currently operating.

11. The anomaly diagnosis system according to claim 1, wherein the subject electronic control unit is further configured to store data indicating where, among the plurality of electronic control units and a power source provided by the in-vehicle battery, the anomaly is determined to occur.

12. The anomaly diagnosis system according to claim 1, wherein the subject electronic control unit is further configured to:

cause the determined one of the plurality of electronic control units to store said data indicating that the anomaly occurred, when one of the plurality of electronic control units is determined to be where the anomaly occurs.

13. The anomaly diagnosis system according to claim 1, wherein:

the subject electronic control unit is further configured to compare, in the diagnosis section, the integrated values of at least two of the plurality of electronic control units and to determine which one of the at least two of the plurality of electronic control units the anomaly occurred in based on the comparison.

14. The anomaly diagnosis system according to claim 1, wherein:

the subject electronic control unit is further configured to determine, in the diagnosis section, that the anomaly occurs in a power source provided by the in-vehicle battery, when each of a plurality of the integrated values with respect to the plurality of electronic control units is greater than a second predetermined value.

\* \* \* \* \*